United States Patent
Sakata (10) Patent No.: US 7,177,907 B2
(45) Date of Patent: Feb. 13, 2007

(54) MESSAGE RECEPTION DEVICE, MESSAGE RECEPTION METHOD, AND PROGRAM FOR RECEIVING MESSAGE IS RECORDED

(75) Inventor: Kazuhiro Sakata, Tokyo (JP)

(73) Assignee: NEC Corporation, Tokyo (JP)

( * ) Notice: Subject to any disclaimer, the term of this patent is extended or adjusted under 35 U.S.C. 154(b) by 667 days.

(21) Appl. No.: 10/043,213

(22) Filed: Jan. 14, 2002

(65) Prior Publication Data

US 2002/0095468 A1    Jul. 18, 2002

(30) Foreign Application Priority Data

Jan. 12, 2001    (JP)    ............................. 2001-005469

(51) Int. Cl.
*H04B 1/38*    (2006.01)
*H04Q 7/20*    (2006.01)

(52) U.S. Cl. .................... 709/206; 455/90.2; 455/3.01; 455/514; 701/215; 701/214; 701/208; 340/989; 340/990

(58) Field of Classification Search ........ 709/204–206, 709/217, 238; 370/230, 235, 263; 710/20, 710/60; 707/10; 375/130, 250; 455/456, 455/432, 414, 90.2, 514; 342/357.03; 701/213; 340/902–903
See application file for complete search history.

(56) References Cited

U.S. PATENT DOCUMENTS

| | | | |
|---|---|---|---|
| 6,108,365 A * | 8/2000 | Rubin et al. ................ | 375/130 |
| 6,236,365 B1 * | 5/2001 | LeBlanc et al. ............ | 342/457 |
| 6,292,747 B1 * | 9/2001 | Amro et al. ................. | 701/213 |
| 6,311,069 B1 * | 10/2001 | Havinis et al. .......... | 455/456.4 |
| 6,377,810 B1 * | 4/2002 | Geiger et al. ............ | 455/456.2 |
| 6,411,811 B2 * | 6/2002 | Kingdon et al. ......... | 455/456.5 |
| 6,442,549 B1 * | 8/2002 | Schneider .................... | 707/10 |
| 6,473,794 B1 * | 10/2002 | Guheen et al. ............. | 709/223 |
| 6,640,304 B2 * | 10/2003 | Ginter et al. ................ | 713/193 |
| 6,683,538 B1 * | 1/2004 | Wilkes, Jr. .................. | 340/903 |
| 6,763,226 B1 * | 7/2004 | McZeal, Jr. ................ | 455/90.2 |
| 6,850,252 B1 * | 2/2005 | Hoffberg .................... | 715/716 |

FOREIGN PATENT DOCUMENTS

JP    9-281918    10/1997

* cited by examiner

*Primary Examiner*—David Wiley
*Assistant Examiner*—Jude Jean-Gilles
(74) *Attorney, Agent, or Firm*—Young & Thompson (57) ABSTRACT

Messages with a valid range are selected by a message filter unit among the messages received through a network by a message reception unit, and the selected messages with a valid range are temporarily stored in a message storage unit. A message delivery assessment unit compares periodically the valid range of the stored message with a valid range with a current position obtained by a positioning unit, and a message delivery unit delivers the message with a valid range for which the current position is in the valid range, to a user. As a result, the message reception device can deliver the message valid in a specific location to the user with an appropriate timing.

1 Claim, 8 Drawing Sheets

MESSAGE WITHOUT A VALID RANGE

From:sato@ooo.ooo.ooo
To:sakata@abc.def.ghi
Date:Wed, 11 Oct 2000 11:06:51 +0900
Subject: Hello !

Hello .

FIG. 3

EXAMPLE OF MESSAGE WITH A VALID RANGE 1

From:sato@ooo.ooo.ooo
To:sakata@abc.def.ghi
Date:Wed, 11 Oct 2000 11:06:51 +0900
Subject: Hello !
X-AreaInfo:(N35. 39. 36. 38E139. 45. 34. 47. 100m)

Hello .

FIG. 4

EXAMPLE OF MESSAGE WITH A VALID RANGE 2

From:sato@ooo.ooo.ooo
To:sakata@abc.def.ghi
Date:Wed, 11 Oct 2000 11:06:51 +0900
Subject: Hello !

⟨AreaInfo=N35. 39. 36. 38E139. 45. 34. 47, 100m⟩
Hello .

FIG. 5

| TITLE | : SENDER | : CONTENT | : VALID RANGE (POSITION, DISTANCE) |
|---|---|---|---|
| ON SALE | : sato@ooo.ooo.ooo | : NOW ON SALE IN THE ○○ STORE | : (N35.39.36.38E139.45.34.47.100m) |
| HOUSE | : suzuki@qqq.qqq. | : MY HOUSE IS IN THIS NEIGHBORHOOD. PLEASE VISIT BY ALL MEANS. | : (N35.39.36.38E139.45.34.47.300m) |
| ADVERTISEMENT INFORMATION | : tanaka@abc.abc.ab | : JAPANESE RESTAURANT △△ FIVE MINUTES FROM HERE ON WALKING | : (N35.39.36.38E139.45.34.47.300m) |
| HALL INVITATION | : info@zzz.zzz.zzz | : EXHIBITION BEING HELD AT NEARBY □□ | : (N35.39.36.38E139.45.34.47.200m) |
| ......... | | | |

MESSAGE RECEPTION DEVICE, MESSAGE RECEPTION METHOD, AND PROGRAM FOR RECEIVING MESSAGE IS RECORDED

BACKGROUNDS OF THE INVENTION

1. Field of the Invention

The present invention relates to a message reception device and a message reception method for deciding the timing for delivering a received message to a user based on the user's current position, and a recording medium in which a program for receiving messages is recorded.

2. Description of the Related Art

Conventionally, for this type of message reception devices, those receiving e-mails are one example. In this case, a message means the data sent by a user of a message transmission device to a user of the message reception device, and in the case of an e-mail system, it means the e-mail to be sent.

Figure 8:
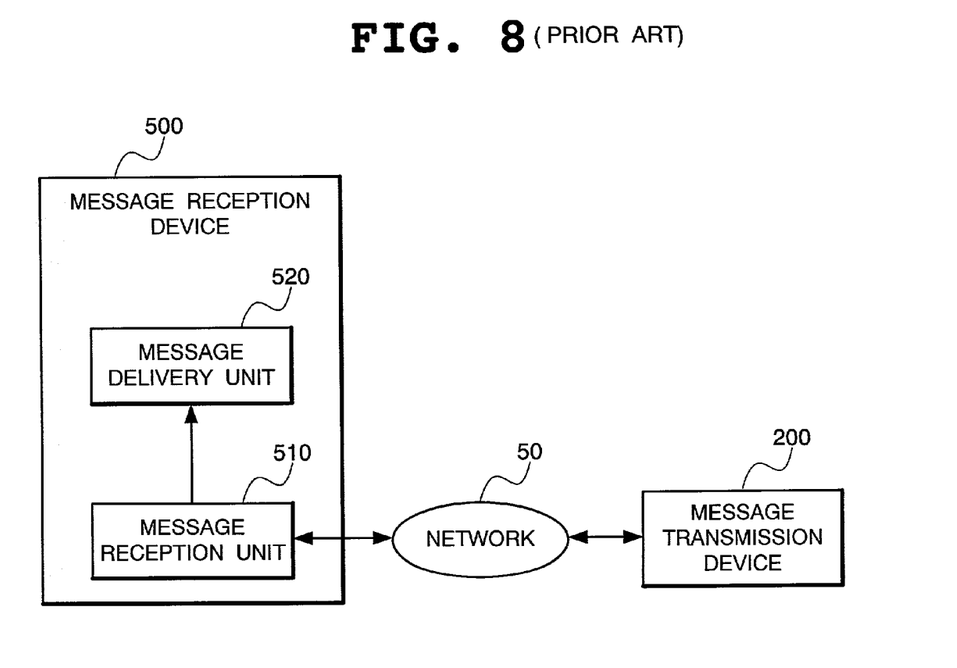
FIG. 8 is a block diagram showing a simplified configuration of a system that has adopted a conventional message reception device.

In the following, a conventional message reception device will be described with reference to FIG. 8. FIG. 8 is a block diagram showing a simplified configuration of a conventional system including a conventional message reception device. In FIG. 8, the conventional system consists of a message transmission device 200, a message reception device 500, and a network 50 for connecting the message transmission device 200 to the message reception device 500. In addition, there are single devices having the functions of both the message transmission device 200 and the message reception device 500. The message transmission device 200 sends a message through the network 50, and the message reception device 500 receives the message sent through the network 50 and delivers the received message to the user. The message reception device 500 consists of a message reception unit 510 for communicating with the message transmission device 200 through the network 50 to receive the message, and a message delivery unit 520 which, together with a user interface, delivers the message received by the message reception unit 510 to the user. Thus, the user of the message reception device 500 receives and refers to the message prepared and sent by another user with the message transmission device 200.

In this case, the message reception device 500 of the conventional system delivers the message to the user through the message delivery unit 520, upon reception of the message. Therefore, even if the sender of the message sends a message having a content that is valid only at a specific location, the message is delivered irrespective of whether the recipient is at that location. Therefore, in order to send a message having a content that is valid only at a specific location by use of the conventional system, the sender had to send the message after having checked the current position of the recipient and making sure that the recipient was at the specific location. However, a sender can not always locate the current position of a recipient, and it was difficult to send correctly a message having a content that is valid only at a specific location when the current position of the recipient could not be known.

Figure 9:
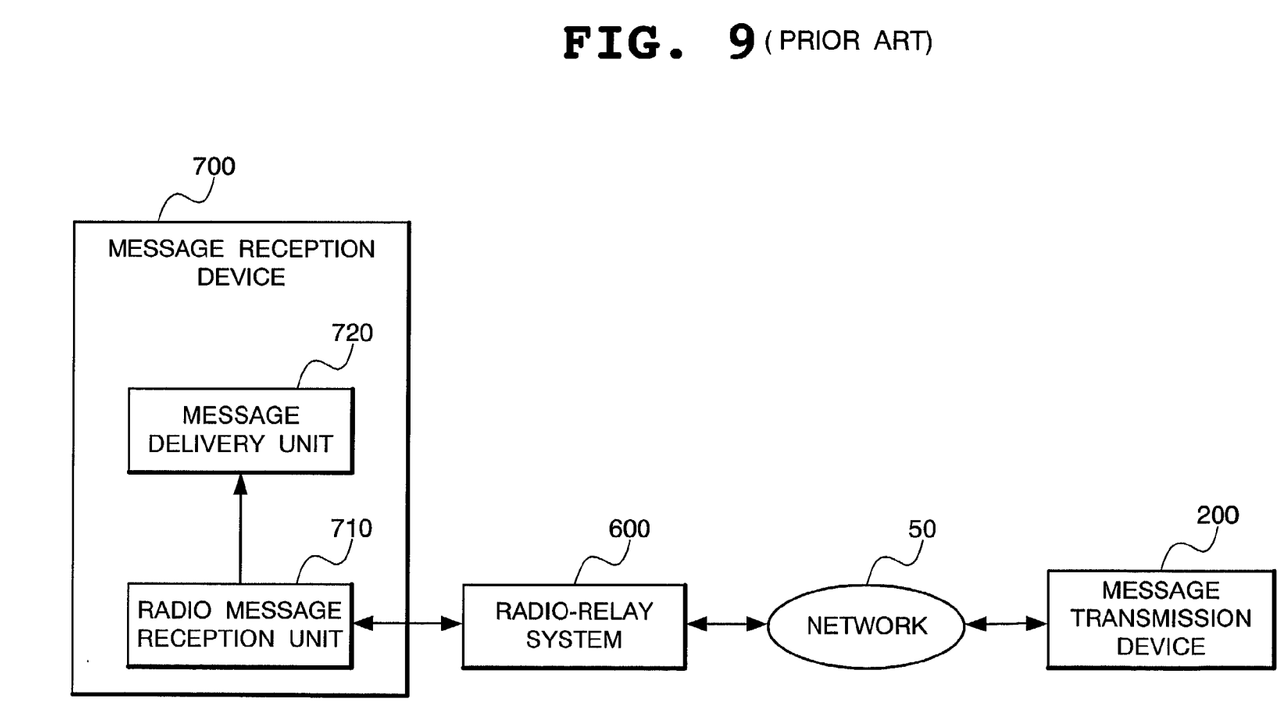
FIG. 9 is a block diagram showing a simplified configuration of another system that has adopted a conventional message reception device.

Next, another conventional message reception device will be described with reference to FIG. 9. FIG. 9 is a block diagram showing a simplified configuration of another conventional system including another conventional message reception device. In FIG. 9, the same parts as FIG. 8 have the same reference numerals and their description will not be repeated. In FIG. 9, numeral 600 denotes a radio-relay system, and numeral 700 donates a message reception device. The radio-relay system 600 sends a message received from the message transmission device 200 through the network 50 to a message reception device 700 nearer to a radio. The message reception device 700 consists of a radio message reception unit 710 for communicating with the message sending device 200 through the radio-relay system 600 to receive the message, and a message delivery unit 720 which, together with a user interface, delivers the message received by the radio message reception unit 710 to the user. In another conventional system, by having the message transmission device 200 designate the radio-relay system 600 and send a message, a message can be sent to the message reception device 700 near the radio-relay system 600.

Therefore, the sender of the message can designate a specific area to send the message, and the user of the message reception device 700 can receive the message sent after the area has been designated. Further, another conventional system may send the message to a plurality of users after the area has been designated. However, with another conventional system, even when information that is valid in a specific area had to be sent only to a specific user, regardless of whether the user was actually in the area, the transmission of information still had to be maintained to that area, which was costly and ineffective.

SUMMARY OF THE INVENTION

In consideration of the above circumstances, a first object of the present invention is to provide a message reception device capable of delivering a message having a content that is valid at a specific geographic location to a user with an appropriate timing.

A second object of the present invention is to provide a message reception device capable of reducing the storage content of a message storage unit by deleting messages with a valid range, which are not delivered to the user after its time limit of validity is exceeded.

A third object of the present invention is to provide a message reception device capable of receiving only a message with a valid range from a sender who is expected by the user, and excluding a message with a valid range from a sender who is unwanted by the user.

A fourth object of the present invention is to provide a message reception device capable of reducing traffic when a sender sends a message with a valid range.

According to the first aspect of the invention, a message reception device comprises message reception means for receiving a message through a network, message filter means for screening messages with a valid range including a valid range from the received messages, positioning means for measuring its own current position, message delivery assessment means for selecting the message with a valid range in which the measured current position is within the valid range, and message delivery means for delivering the message with a valid range received by the message reception means or selected by the message delivery assessment means to a user.

In the preferred construction, the message reception device further comprises message storage means for storing the message with a valid range.

In another preferred construction, the screening of the messages with a valid range by the message filter means is targeted to the message satisfying a predetermined condition.

In another preferred construction, the predetermined condition for screening the messages with a valid range by the message filter means is a sender of the message with a valid range.

In another preferred construction, the message storage means comprises clock means, sets a limit of validity to the message with a valid range, stores the a limit of validity, and deletes the message with a valid range whose limit of validity has been exceeded.

In another preferred construction, the limit of validity of the message with a valid range is after a given time period from the time when the message with a valid range is stored.

In another preferred construction, the limit of validity of the message with a valid range is the limit indicated in the limit of validity information added to the message with a valid range.

In another preferred construction, assessment within the valid range by the message delivery assessment means is performed whether the measured own current position is within a predetermined radius centered on a center position of the valid range.

In another preferred construction, the message filter means delivers the message by the message delivery means when receiving the message, and stores the message with a valid range specified by the user in the message storage means.

In another preferred construction, the message delivery means assesses whether a pointer information is included in the message with a valid range, obtains the information pointed to by the pointer information when the pointer information is included, and delivers the obtained information to the user.

In another preferred construction, the message delivery means is a device separated from a main body of the message reception device.

According to the second aspect of the invention, a message reception method comprising the steps of
receiving a message through a network,
screening messages with a valid range including a valid range from the received messages and storing the message with a valid range,
measuring its own current position,
selecting a message with a valid range for which the measured current position is within the valid range from the stored messages with a valid range, and
delivering the selected message with a valid range to a user.

In the preferred construction, the screening of the messages with a valid range is targeted to the message satisfying a predetermined condition.

In another preferred construction, the predetermined condition for screening the messages with a valid range is a sender of the message with a valid range.

In another preferred construction, the message with a valid range is stored by setting a limit of validity to the message with a valid range, and the message with a valid range whose limit of validity has been exceeded is deleted.

In another preferred construction, the limit of validity of the message with a valid range is after a given time period from the time when the message with a valid range is stored.

In another preferred construction, the limit of validity of the message with a valid range is the limit indicated in the limit of validity information added to the message with a valid range.

In another preferred construction, the assessment within the valid range is made whether the measured own current position is within a predetermined radius centered on a center position of the valid range.

In another preferred construction, the message received from the network is delivered to a user when the message is received, and the message with a valid range specified by the user is stored.

In another preferred construction, delivery of the message with a valid range to a user is performed by obtaining information pointed to by a pointer information when the pointer information is included in the message with a valid range, and delivering the obtained information to the user.

According to another aspect of the invention, a program for receiving messages which controls a computer to perform message reception processing, comprising the functions of
a function of receiving a message through a network,
a function of screening messages with a valid range including a valid range from the received messages, and
a function of storing a screened message with a valid range in a message storage unit, and delivering a message which was not screened to a user.

According to a further aspect of the invention, a program for receiving messages which controls a computer to perform message reception processing, comprising the functions of
a function of measuring its own current position,
a function of selecting a message with a valid range for which the measured current position is in its valid range from the messages with a valid range, and
a function of delivering the selected message with a valid range to a user.

According to a still further aspect of the invention, a program for receiving messages which controls a computer to perform message reception processing, comprising the functions of
a function of receiving a message through a network,
a function of screening messages with a valid range including a valid range from the received messages,
a function of storing the screened message with a valid range in a message storage unit, and delivering a message which was not screened to a user,
a function of measuring its own current position,
a function of selecting the stored message with a valid range for which the measured current position is in its valid range, and
a function of delivering the selected message with a valid range to a user.

Other objects, features and advantages of the present invention will become clear from the detailed description given herebelow.

BRIEF DESCRIPTION OF THE DRAWINGS

The present invention will be understood more fully from the detailed description given herebelow and from the accompanying drawings of the preferred embodiment of the invention, which, however, should not be taken to be limitative to the invention, but are for explanation and understanding only.

In the drawings.

DESCRIPTION OF THE PREFERRED EMBODIMENT

The preferred embodiment of the present invention will be discussed hereinafter in detail with reference to the accompanying drawings. In the following description, numerous specific details are set forth in order to provide a thorough understanding of the present invention. It will be obvious, however, to those skilled in the art that the present invention may be practiced without these specific details. In other instance, well-known structures are not shown in detail in order to unnecessary obscure the present invention.

A message reception device according to an embodiment of the present invention will be described below with reference to the drawings. First, a message in the embodiment will be described. A message means information exchanged among a plurality of users, and any media such as texts, images, sounds, and binary data, which can be used by both a sender and a recipient, may be used as a medium for the message. An example of a message is e-mail. The messages are grouped into "messages with a valid range" and "messages without a valid range". The "valid range" means information related to the location where the message should be delivered, and a message with a valid range means a message that includes information on the valid range, while a message without a valid range means a message that does not include a valid range.

In addition, any method that can be recognized commonly within the system may be used for the format and the description method of the valid range. For example, a method that defines a specific header to represent a valid range is one method for including a valid range in an e-mail message. In this method, however, a change must be made to conventional message transmission devices. Another method is to describe the positional information starting with a specific character string at the first line of the text body of the e-mail. In this method, the sender of the message can send the message with a valid range without adding any particular change to a conventional message transmission device.

Figure 2:
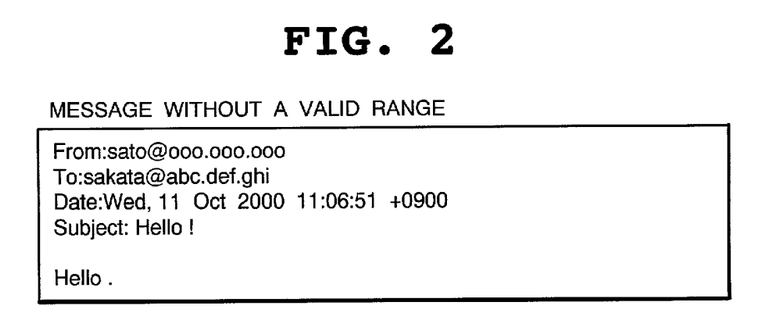
FIG. 2 is a drawing showing a configuration of a message according to the same embodiment.
Figure 3:
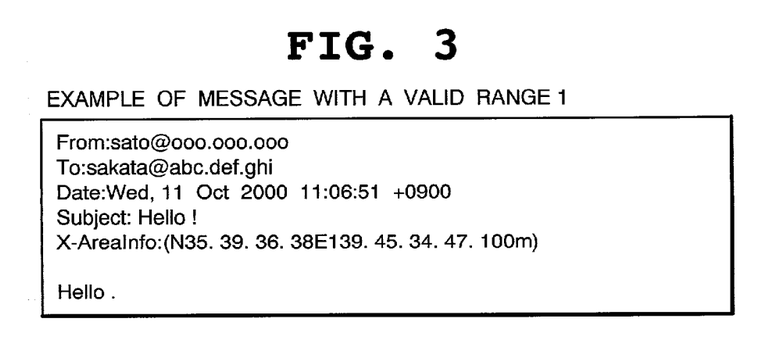
FIG. 3 is a drawing showing a configuration of a message according to the same embodiment.
Figure 4:
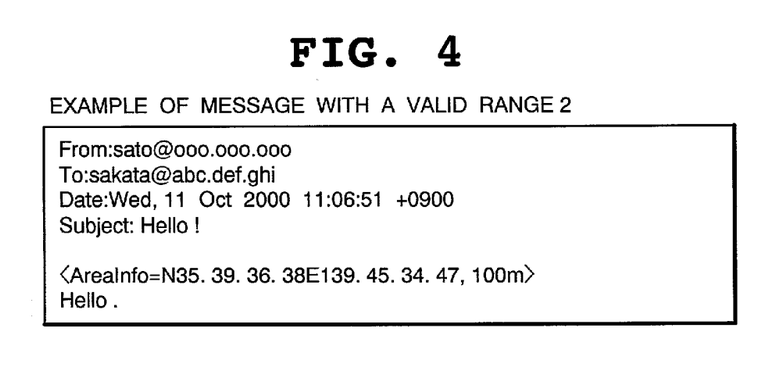
FIG. 4 is a drawing showing a configuration of a message according to the embodiment.

FIGS. 2–4 show examples of messages with/without a valid range according to the embodiment. The message shown in FIG. 2 is a message without a valid range. The message shown in FIG. 3 is a message with a valid range in which the valid range is represented with a header starting with "X-AreaInfo:", and the message shown in FIG. 4 is a message with a valid range that represents the valid range with a line starting with "<AreaInfo=" at the first line of the text body. The Information representing the valid range in each of the messages shown in FIGS. 3, 4 is "N35.39.36.38E139.45.34.47,100m". The method may be used, in which a flag information indicating that the message includes a valid range is added to the message together with the information on the valid range, to indicate whether the message includes a valid range.

Figure 1:
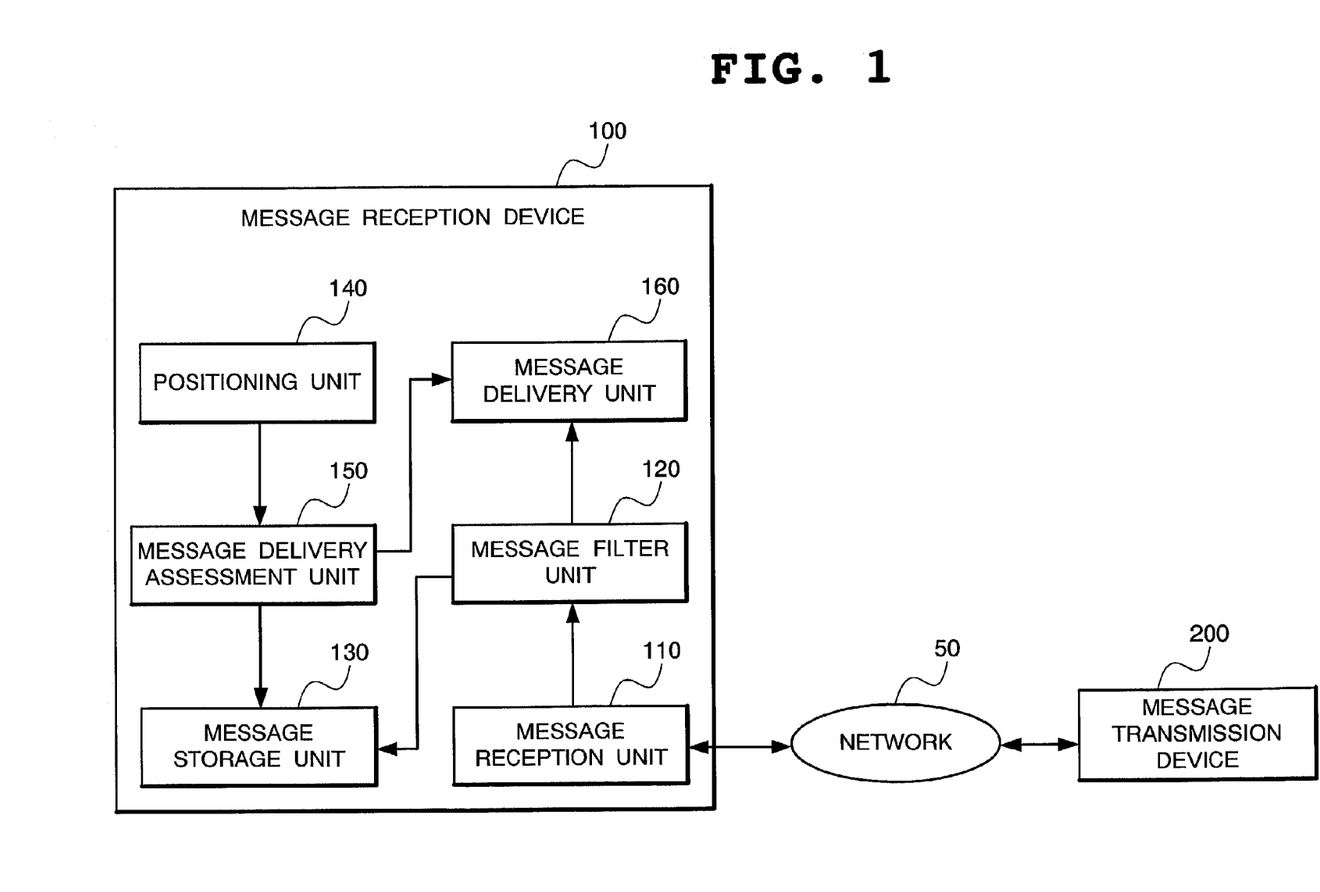
FIG. 1 is a block diagram showing a simplified configuration of a system that has adopted a message reception device according to an embodiment of the present invention.

Next, the configuration of the message reception device according to the embodiment will be described with reference to FIG. 1. FIG. 1 shows a simplified configuration of the system that has adopted the message reception device according to the embodiment. In FIG. 1, the same parts as FIGS. 8, 9 have the same reference numerals and their description will not be repeated. In FIG. 1, the system consists of a message reception device 100, a message transmission device 200, and a network 50 for connecting the message reception device 100 to the message transmission device 200. A network consisting of the combination of a public radio network and the Internet can be used as the network 50. The message reception device 100 receives the message sent from the message transmission device 200 through the network 50 and delivers the received message to the user.

The message reception device 100 consists of a message reception unit 110, a message filter unit 120, a message storage unit 130, a positioning unit 140, a message delivery assessment unit 150, and a message delivery unit 160, and is carried by a user. The message reception unit 110 communicates with the message transmission device 200 through the network 50 to receive messages. The message filter unit 120 distributes the received messages to either the message storage unit 130 or the message delivery unit 160 based on the presence or absence of the valid range information. The message storage unit 130 stores the messages with a valid range received from the message filter unit 120.

The positioning unit 140 measures the current position of the message reception device 100. A method for implementing the positioning unit 140 may be a method using the GPS (Global Positioning System), or a method using base station information of the public radio network, however, any method that can measure the current position of the message reception device 100 may be used. The message delivery assessment unit 150 sends the message with a valid range stored in the message storage unit 130 to the message delivery unit 160 with a specific timing using the current position information obtained from the positioning unit 140.

The message delivery unit 160 delivers, together with a user interface, the message received from the message filter unit 120 or from the message delivery assessment unit 150, to the user. The delivering function of the message delivery unit 160 includes a function for displaying the message with the font size specified by the user when the message is text, a function for notifying the user with a sound or a light when a new message arrives, and a function for storing the messages, which were received in the past, organizing them by items such as arrival time and sender, and presenting them to the user as a list.

Figure 5:
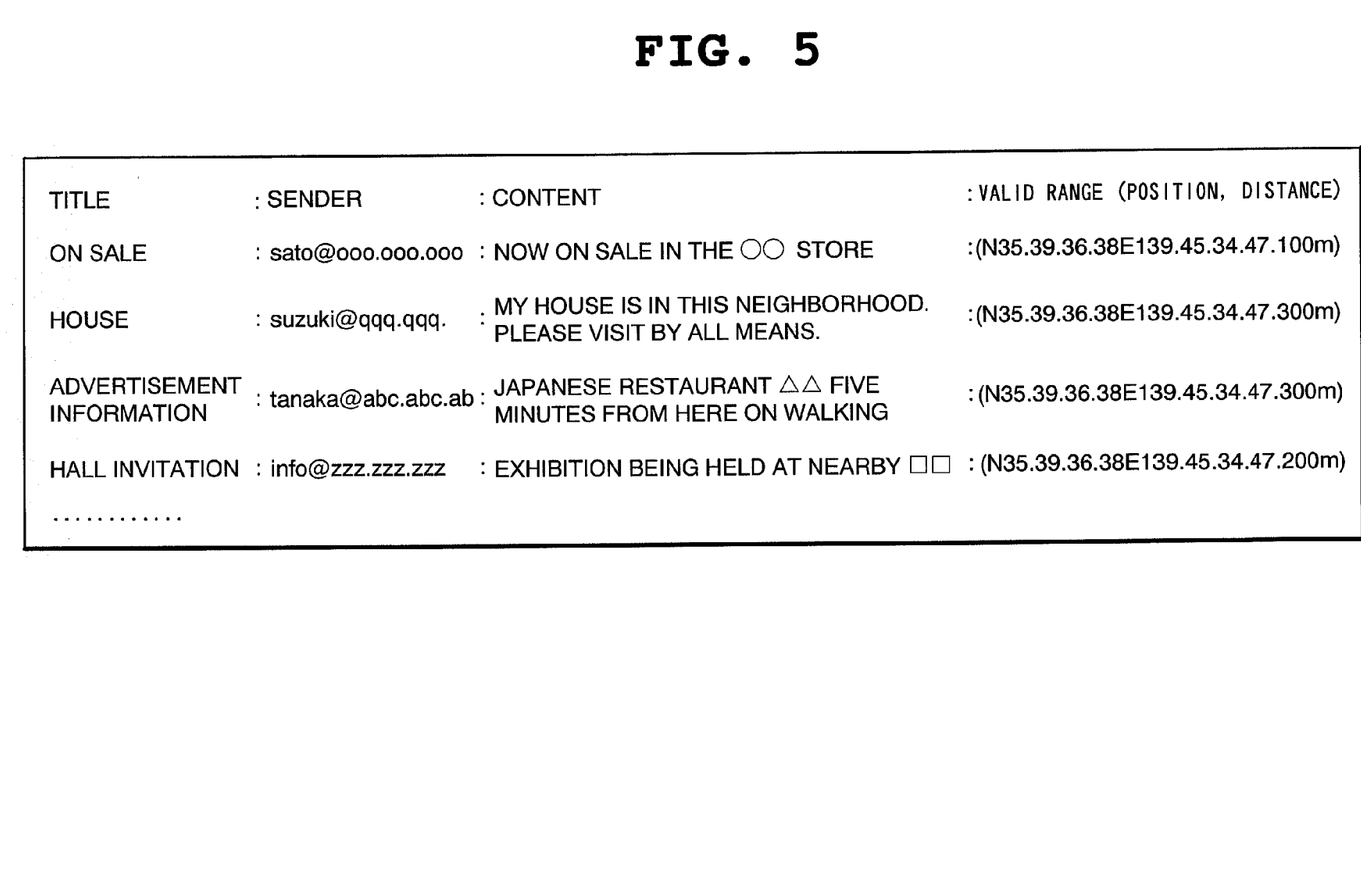
FIG. 5 is a drawing showing the content of data stored in a message storage unit of the message reception device according to the same embodiment.

Next, the data stored in the message storage unit 130 according to the embodiment will be described with reference to FIG. 5. FIG. 5 is a drawing showing the configuration of the data stored in the message storage unit 130 in a case where it is using e-mails as messages. In FIG. 5, information on the "title", the "sender", the "content", and the "valid range" are stored and managed in each message.

In addition, information on at least the "content" and the "valid range" should be managed for each message, however, the other information may not necessarily have to be managed. The valid range is represented by the combination of a position and a distance, in other words, the area of a circle centered on the position and having the radius as the distance represents the valid range.

In addition, any method that can be recognized in common within the system may be used for the description method of the valid range. For example, the method of representing the valid range with a collection of the positions of the vertices of a polygonal range may be used. Alternatively, the valid range may be set to be the area of a circle having a fixed size defined by the system so that only the center position has to be shown in the message. Further, though planar information is handled as the valid range in the embodiment, spatial information may be handled using additional information such as height. In the embodiment, only one valid range information is assigned to one message, however, a plurality of valid range information may be assigned to one message.

Figure 6:
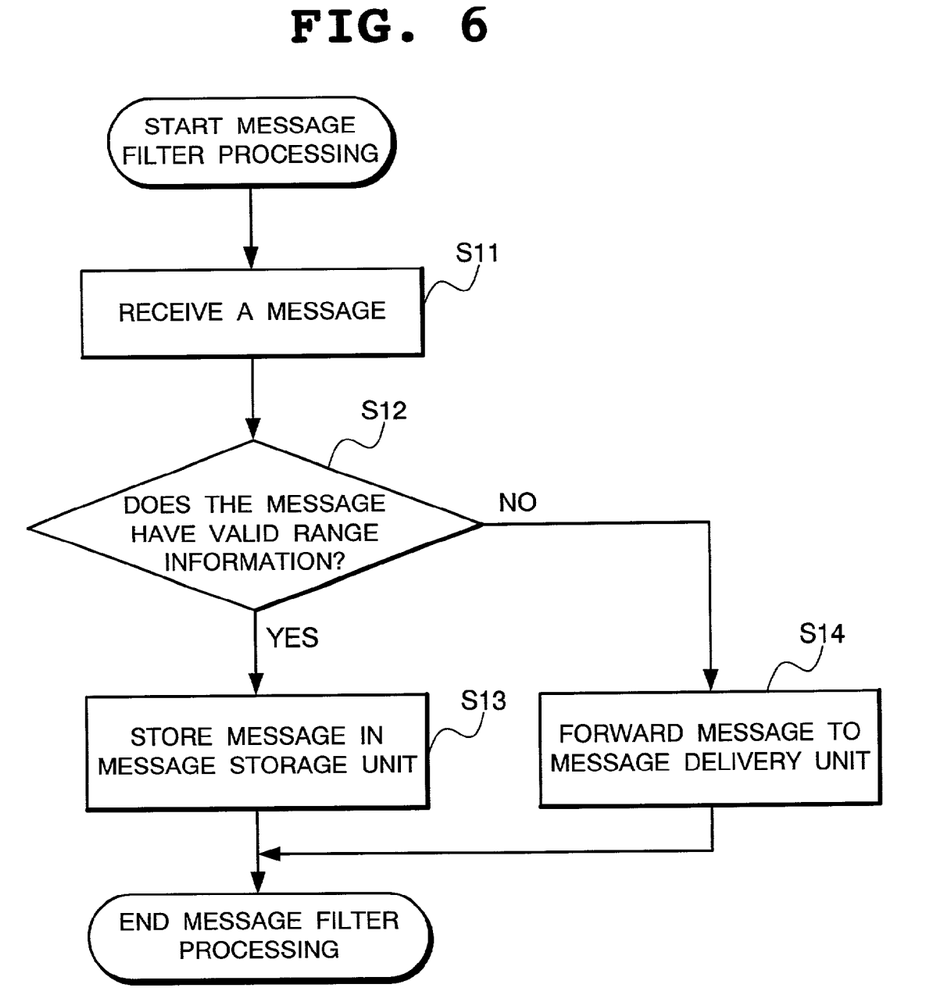
FIG. 6 is a flowchart showing the flow of processing in a message filter unit of the message reception device according to the same embodiment.

Next, the operation of the message reception device 100 according to the embodiment will be described with reference to FIGS. 6 and 7. Processing by the message reception device consists of distribution processing of the received messages and delivery processing of stored messages. First of all, the operation of the message distribution processing will be described with reference to FIG. 6, in which the message reception device 100 receives the message, assesses the presence or the absence of the valid range information of the received message, and processes the message based on the result. FIG. 6 is a flowchart showing the operation of the received message distribution processing in the message reception device 100 according to the embodiment. The received message distribution processing is mainly performed by the message filter unit 120 shown in FIG. 1. First, the message filter unit 120 receives from the message reception unit 110, the message that was received by the message reception unit 110 through the network 50 (step S11).

Then, the message filter unit 120 refers to the received message and assesses whether the message includes the valid range information (step S12). For example, when the valid range is expressed by a specific header in the message, the assessment can be performed by checking the presence or the absence of the header. When flag information showing the presence or the absence of the valid range is included in the message, the assessment can be performed by referring to the flag. As a result of the assessment in step S12, when the message includes the valid range information, in other words, when the message is a message with a valid range, the message filter unit 120 sends the message with a valid range to the message storage unit 130, and the message storage unit 130 stores the message with a valid range (step S13) and ends the processing. As a result of the assessment in step S12, when the message does not include valid range information, in other words, when the message is the message without a valid range, the message filter unit 120 sends the message without a valid range to the message delivery unit 160, and the message delivery unit 160 delivers the message without a valid range to the user (step S14) and ends the processing.

With such processing, the message reception device 100, when receiving the message with a valid range, stores it in the message storage unit 130 temporarily without delivering it to the user at this time. The message reception device 100, when receiving the message without a valid range, delivers it to the user through the message delivery unit 160 upon receipt of the message in the same fashion as processing of the conventional message reception device.

Next, the operation of message delivery processing will be described with reference to FIG. 7, in which the message with a valid range having a valid range stored in the message reception device according to the embodiment, is delivered to the user. FIG. 7 is a flowchart showing the operation of the message delivery processing in the message reception device according to the embodiment. The message delivery processing is mainly performed by the message delivery assessment unit 150 shown in FIG. 1. In FIG. 7, first, the message delivery assessment unit 150 obtains the information on current position of the message reception device 100 measured by the positioning unit 140 (step S21). Then, the message delivery assessment unit 150 refers to the message with a valid range stored in the message storage unit 130, and assesses whether the current position obtained is included in the valid range of the message with a valid range (step S22). When the valid range is a circle described by the center position and the radius, the assessment is performed by assessing whether the distance between the current position and the center position is less than or equal to the radius.

As a result of the assessment in step 22, when the current position is out of the valid range of the message with a valid range, the message filter unit 120 ends the processing of the message with a valid range, and performs the processing of steps S22 to S23 on the next message with a valid range in the message storage unit 130. As a result of the assessment in step S22, when the current position is within the valid range of the message with a valid range, the message delivery assessment unit 150 sends the message with a valid range to the message delivery unit 160 and deletes the message with a valid range from the message storage unit 130 (step S23). Thus, the message delivery unit 160 delivers the message with a valid range to the user, and notifies the user of the arrival of the message when the message delivery unit 160 has a function of notifying the user that a new message has arrived (step S23).

Then, the message delivery assessment unit 150 performs the processing of steps S22 to S23 sequentially in the same fashion as the above on all the messages with a valid range in the message storage unit 130. Subsequently, the message delivery assessment unit 150 stands by for a given period of time (step S24), and repeats the processing after step S21. As a result of such processing, the message reception device 100 can deliver the message with a valid range to the user when the user moves into the valid range of the message with a valid range stored in the message storage unit 130.

As described above, the message reception device 100 can deliver the message with a valid range received from the message transmission device 200 at the time when the user moves into the valid range with the received message distribution processing and the stored message delivery processing. For messages without a valid range, the message reception device 100 can deliver the message without a valid range to the user when the message is received, in the same fashion as the conventional message reception device.

The message reception device 100 according to the embodiment can process the message with a valid range without adding any particular change to the message transmission device 200. For example, when e-mail is used as the message, e-mail with a valid range can be handled by changing the message reception device 100 only, and the sender of the e-mail can use the message transmission device 200 as it is.

Next, other different embodiments of the present invention will be described. In the above embodiment, the message reception device 100 and the message transmission device 200 are used as independent devices. Without being limited to the above, the message reception device 100 may have the functions of the message transmission device 200. Thus, a single device can receive messages from another message transmission device 200 and send messages to another the message reception device 100.

In the embodiment, the message with a valid range stored in the message storage unit 130 is kept until the user moves into the valid range. The message with a valid range may be configured in such a way that an valid period may be set to the message with a valid range stored in the message storage unit 130. As a method of setting a limit of validity, for example, when the message storage unit 130 receives the message filter unit 120, the time point after a given time from the current time is set as the limit of validity, and it is stored as a limit of validity information. Alternatively, a method to describe the limit of validity, which is common within the system, may be defined, the sender of the message, when sending the message with the valid range, sends it with the limit of validity added, and the message storage unit 130 stores the limit of validity together with the message with a valid range. When the limit of validity has been set to the message with a valid range, the message storage unit 130 may compare periodically the limit of validity of a message with a valid range stored therein, with the current time, and may delete an expired message with a valid range or may send the expired message with a valid range to the message delivery unit 160 before deleting it. Such processing can reduce the amount of messages with a valid range stored in the message storage unit 130, and free the storage area needed for the message storage unit 130. Further, a message with a valid range in which the content of the information is valid for only a given period of time can be delivered to the user appropriately.

In the embodiment, the message filter unit 120 stores all messages with a valid range into the message storage unit 130. Without being limited to the above, the message filter unit 120 may filter the messages with specific conditions specified by the user, such as the sender of the message with a valid range, may store only the messages with a valid range which satisfy the condition into the message storage unit 130, and may discard all other messages with a valid range. For example, it can exclude a message with a valid range from a sender who is unwanted by the user, or conversely, store only the message with a valid range from a sender who is expected by the user, into the message storage unit 130.

Figure 7:
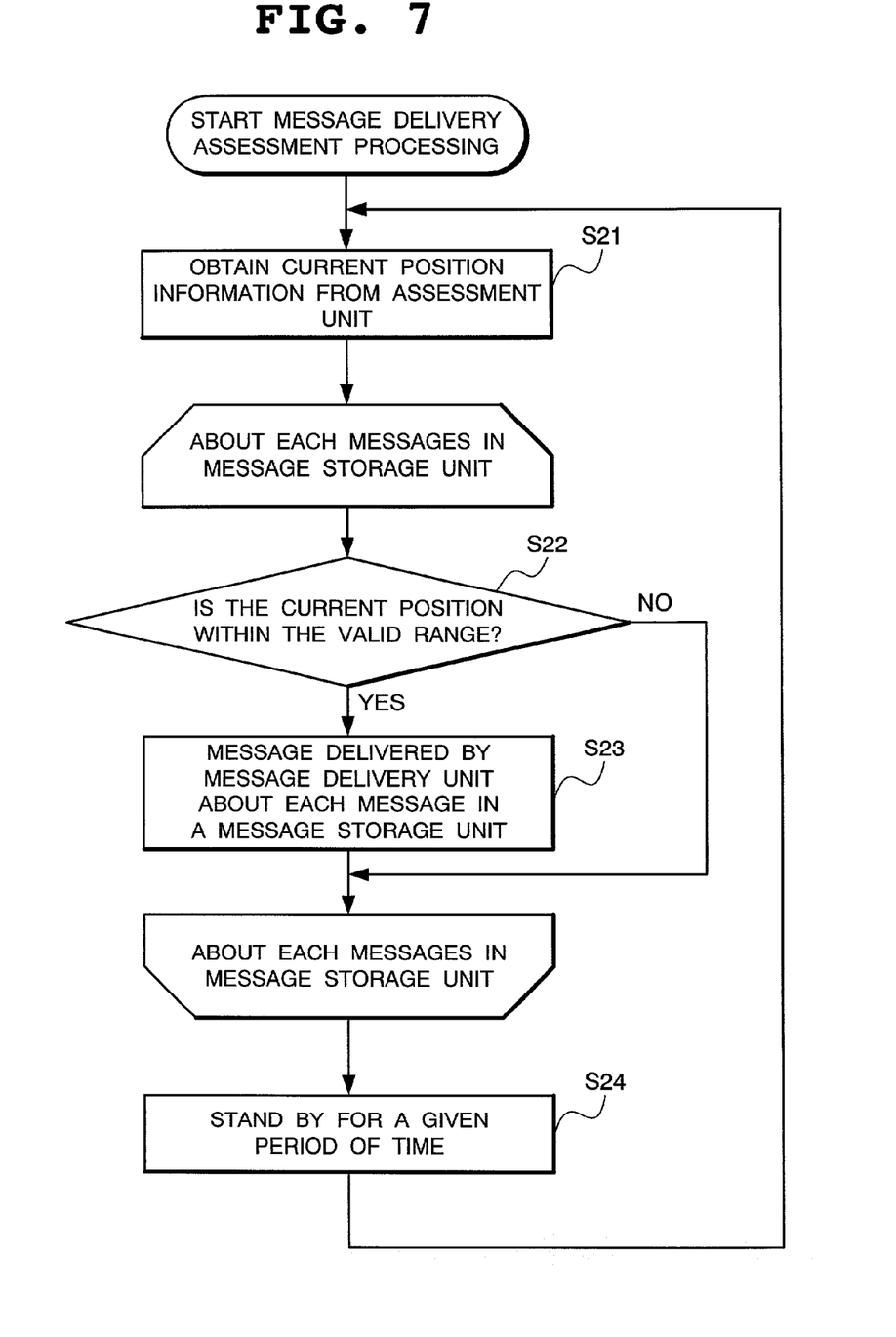
FIG. 7 is a flowchart showing the flow of processing in a message delivery assessment unit of the message reception device according to the same embodiment.

In the embodiment, the message delivery assessment unit 150 obtains the current position measured by the positioning unit 140 in step S21 shown in FIG. 7, and processes steps S22 to S23 unconditionally. The message delivery assessment unit 150 may be configured in such a way that processing in which the message delivery assessment unit 150 keeps the positioning result of the current position, and compares the previous positioning result, which was kept, with the latest current position, are added after step S21, and only when the user moves by a given distance or more, steps S22 to S23 may be processed. This can reduce the number of processing performed when the user stays in the same position.

In the embodiment, the message filter unit 120 stores the messages with a valid range received from the message reception unit 110 into the message storage unit 130. Without being limited to the above, it may be configured in such a way that a message with a valid range received by the message filter unit 120 is delivered to the user by the message delivery unit 160 first, and stored in the message storage unit 130 only when the user provides instructions to do so. Therefore, the user can decide whether to store the message with a valid range in the message storage unit 130 when receiving the message with a valid range, and if the user decides to store it, the user can refer to the message with a valid range again when the user moves into the valid range.

In the embodiment, when delivering the message with a valid range to the user, the message delivery unit 160 delivers only the information included in the message with a valid range to the user. Without being limited to the above, the message with a valid range may be configured in such a way that pointer information, which points to external information, is added to the message with a valid range, when the message delivery unit 160 delivers the message with a valid range to the user, it checks whether the message with a valid range includes the pointer information, and when the pointer information is included, the information pointed by the pointer information is obtained through the network 50 to deliver the information to the user. This can reduce traffic when the sender sends the message with a valid range.

In the embodiment, the message reception device 100 consists of the message reception unit 110, the message filter unit 120, the message storage unit 130, the positioning unit 140, the message delivery assessment unit 150, and the message delivery unit 160, as single devices respectively. Without being limited to the above, the message reception device 100 may be divided into a message reception device A consisting of only the message delivery unit 160, and a message reception device B consisting of the message reception unit 110, the message filter unit 120, the message storage unit 130, the positioning unit 140, and the message delivery assessment unit 150; the message reception device A and the message reception device B are connected to each other through the network 50, so that the user carries only the message reception device A without carrying the message reception device B. This allows the miniaturization of the device carried by the user.

In the message reception device 100 according to the embodiment, each of the components 110–160 is constituted by separate hardware; instead, a storage medium in which a program is stored (for example, a hard disk) and a microprocessor that follows the program for data processing may be provided so that the microprocessor performs processing of each part.

Figure 10:
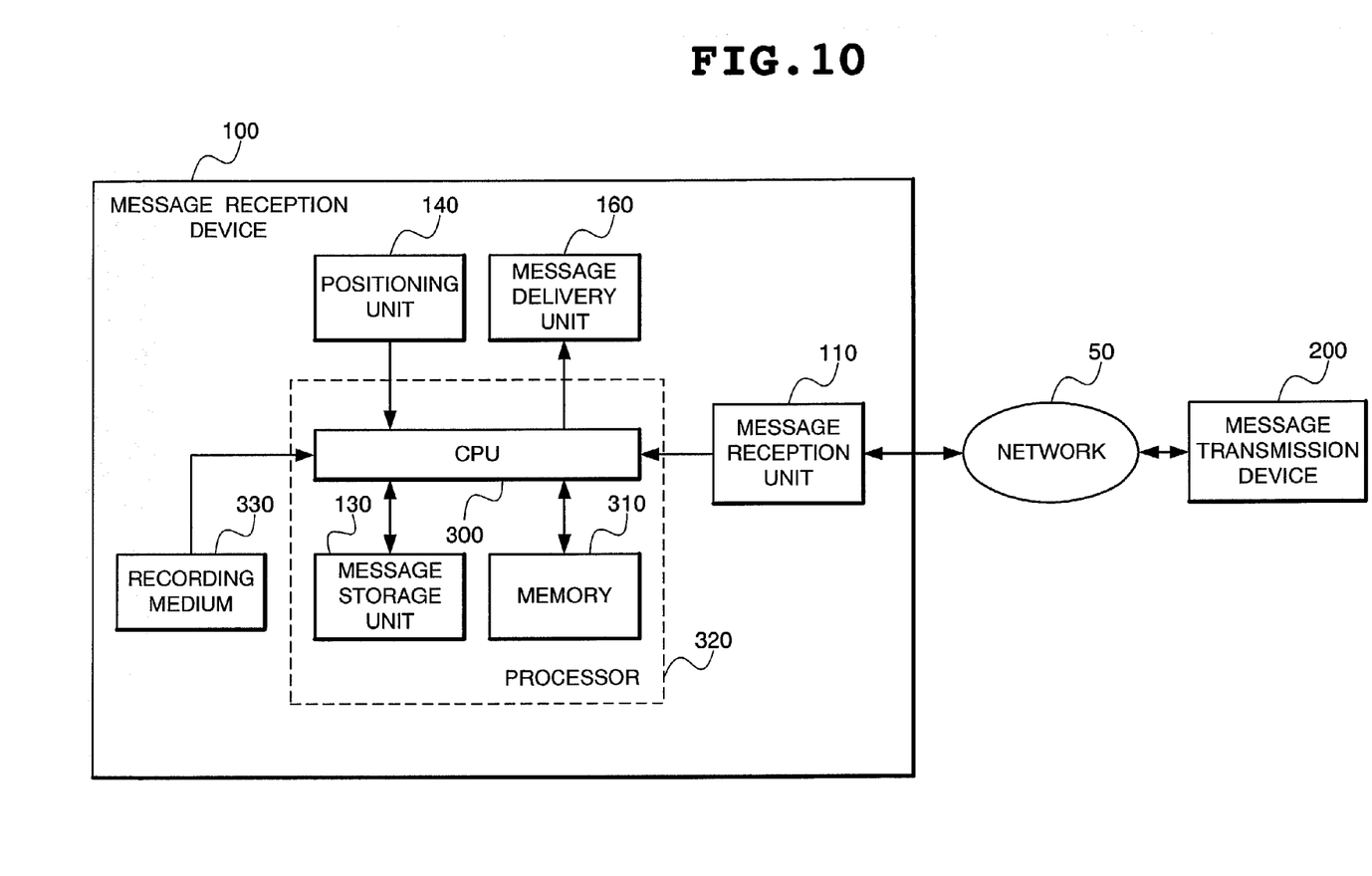
FIG. 10 is a block diagram showing a simplified configuration of a system that has adopted a message reception device according to another embodiment of the present invention.

More concretely, the present invention can be applied with the configuration shown in FIG. 10. In addition, the parts corresponding to the respective parts in FIG. 1 have the same reference numeral.

Referring to FIG. 10, the configuration includes a processor 320 consisting of a CPU (central processing unit) 300, a memory 310, the message storage unit 130, the message reception unit 110 for receiving messages by communicating with the message transmission device 200 through the network 50, the positioning unit 140 for measuring the current position of the message reception device 100, and the message delivery unit 160 for delivering, together with a user interface, the message from the CPU 300 to the user, and further includes a recording medium 330 in which the program for realizing the processes of the flowcharts shown in FIGS. 6, 7 is recorded. A magnetic disk, a semiconductor memory, a CD-ROM, or other storage media may be used as the recording medium 330.

The program for realizing the processes of the flowchart shown in FIG. 6 is read into the processor 320 from the recording medium 330 and controls the operation of the processor 320. When the program is run, it decides whether the message received by the message reception unit 110 holds the information on the valid range, stores the message in the message storage unit 130 when the message holds one, and forwards the message to the message delivery unit 160 when the message does not hold one.

When the program for achieving the flowchart shown in FIG. 7 is run, it obtains the current position information from the positioning unit 140, and delivers the message to the message delivery unit 160 when the message stored in the message storage unit 130 is a message within the valid range of the current position. The program for realizing the processes of the flowchart shown in FIG. 7 may be operated periodically at regular intervals.

As described above, according to the present invention, the message reception device temporarily stores the received message with a valid range in the message storage unit, and delivers the stored message with a valid range to the user when the current position of the user enters the valid range specified by the message with a valid range, so that the message having contents that are valid in a specific location can be delivered to the user with an appropriate timing.

Further, the message reception device sets a limit of validity to a message with a valid range which is temporarily stored in the message storage unit, and deletes an expired message with a valid range which has not been delivered to the user, so that the storage content of the message storage unit can be reduced.

The message reception device filters the messages having valid range, which are temporarily stored in the message storage unit, with the sender for example, so that the message with a valid range from a sender who is expected by the user can be received, and the message with a valid range from a sender who is unwanted by the user can be excluded.

Further, the message reception device obtains information pointed to by the pointer information when the pointer information is included in the message with a valid range, and delivers the obtained information to the user, so that the traffic when the sender sends the message with a valid range can be reduced.

Although the invention has been illustrated and described with respect to exemplary embodiment thereof, it should be understood by those skilled in the art that the foregoing and various other changes, omissions and additions may be made therein and thereto, without departing from the spirit and scope of the present invention. Therefore, the present invention should not be understood as limited to the specific embodiment set out above but to include all possible embodiments which can be embodies within a scope encompassed and equivalents thereof with respect to the feature set out in the appended claims.

What is claimed is:

1. A program for receiving messages which controls a computer to perform message reception processing, comprising the functions of:

a function of receiving e-mail messages through a network;

a function of screening messages with a valid range including a valid geographic position range from the received messages, the screening being repeatedly performed after each given period of time;

a function of storing the screened messages with a valid range in a message storage unit, and delivering a message which was not screened and does not include a valid range to a user;

a function of measuring a current geographic position of the computer;

a function of selecting, from the stored messages, a message with a valid range for which the measured current geographic position is within the valid geographic position range of the message; and a function of delivering the selected message to a user, wherein, at a first time when the current geographic position is determined to be outside the stored valid geographic position range of each stored message, no stored message is delivered, and at a later second time upon the current geographic position being determined to be within one of the stored valid geographic position ranges, the corresponding one of the stored messages is delivered to the user.

* * * * *